United States Patent

Robinson

[11] 4,052,998
[45] Oct. 11, 1977

[54] THREE WAY COCK FOR FILTER PRESS PLATES

[75] Inventor: Hugh S. Robinson, Harbert, Mich.

[73] Assignee: D. R. Sperry & Co., Aurora, Ill.

[21] Appl. No.: 712,784

[22] Filed: Aug. 9, 1976

[51] Int. Cl.² ............................................. F16K 11/07
[52] U.S. Cl. .................................. 137/625.5; 251/218
[58] Field of Search .......................... 137/625.5, 625.69; 251/218

[56] References Cited

U.S. PATENT DOCUMENTS

| 423,105 | 3/1890 | Allen | 137/596 X |
|---|---|---|---|
| 2,415,417 | 2/1947 | Collins et al. | 137/625.69 |

FOREIGN PATENT DOCUMENTS

| 472,593 | 10/1914 | France | 137/625.69 |
| 92,760 | 7/1938 | Sweden | 251/218 |

Primary Examiner—Arnold Rosenthal
Attorney, Agent, or Firm—McWilliams & Mann

[57] ABSTRACT

A three way cock for filter press plates comprising a cock body defining a cylinder portion, a foot portion extending parallel to the cylinder portion, for applying the cock to the side of the plate, and a flange portion connecting the cylinder portion and foot portion through which extend a pair of fluent passages that connect the bore of the cylinder portion, and upper and lower ports formed in the cock cylinder portion with correspondingly located fluent passages of the plate. The cock cylinder portion has reciprocably mounted in same a spool valve member that shifts longitudinally of the cylinder portion under the action of opposed cam surfaces formed in the cylinder portion, and an end cap received over the upper end of the cylinder portion through which the valve member extends for keying connection to an operating knob for turning the valve member to move it between the three operating positions of the cock. The cock body and end cap are coupled together by an interfitting lug and latch pin arrangement. The cock body, end cap, valve member, and knob are molded components formed from a corrosion resisting plastic material.

10 Claims, 7 Drawing Figures

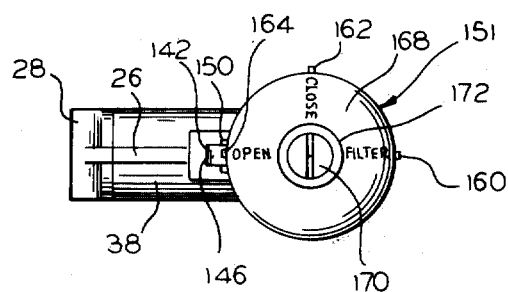
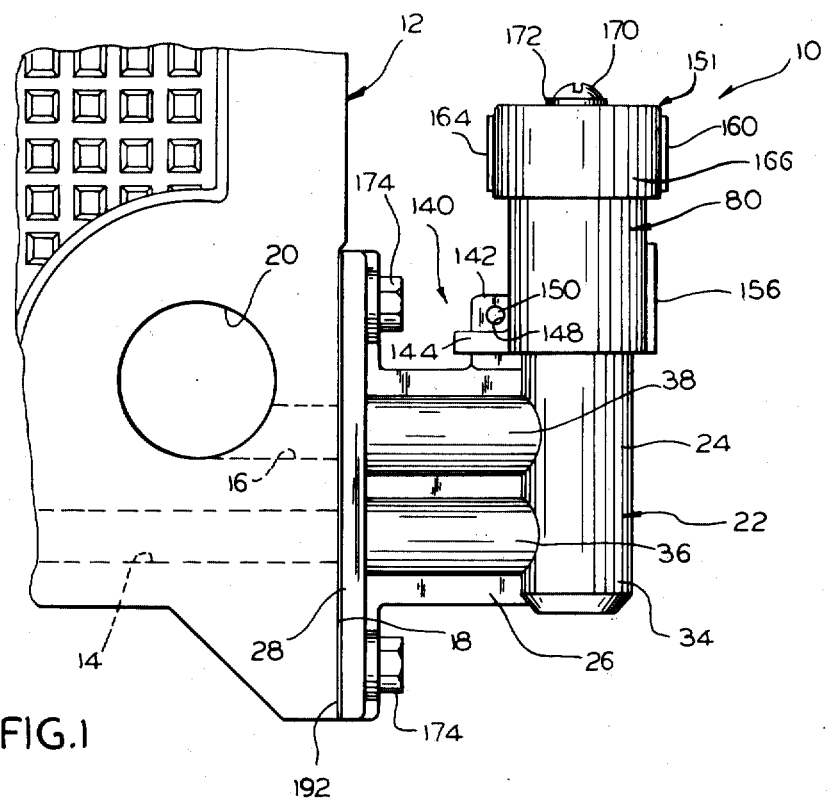
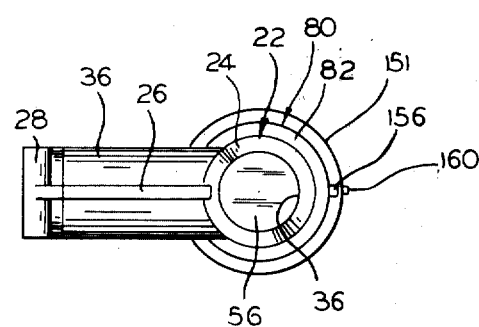

THREE WAY COCK FOR FILTER PRESS PLATES

This invention relates to a three way cock for plates of filter presses, and more particularly, to a cock for filter presses adapted to provide for open and closed discharge as well as an off position.

Filter presses of the general type disclosed in Kratochvil and Eggert U.S. Pat. No. 3,446,358 are frequently equipped with a three way cock attached to the plates for discharge of the fluent in the plate, when desired, either direction to a gutter, or to an internal channel leading to the outlet of the filter press unit.

Conventional three way cocks for filter presses comprise a valve member having a tapered body of frusto-conical configuration formed to provide the fluent flow desired, or the lack of same, in cooperation with a correspondingly configured valve seat of a valve body suitably channeled to provide the flow connections desired. As the tapered fit of the valve member and valve body seat are relied on to seal against leakage through the top of the cock, excessive preciseness has heretofore been required in the shaping of these parts, and thus an undue amount of expensive machining, with any departures from the indicated preciseness of fit resulting in leakage and consequent waste and inefficiency. Further, when the valve member is to be replaced, ordinarily the entire cock has to be replaced in view of the matching fit required for the valve member and its seat.

A principal object of the present invention is to provide a three way cock for filter press plates made up of few and simple parts that may be formed by economical molding operations with minimal machining requirements.

Another important object of the invention is to provide a three way cock in which the valve member is in consistent sealing relation within the valve body in all positions of same with respect thereto, and which incorporates the spool valve approach to control the operation of the cock while permitting the conventional cock turning action to change the cock valve between its operating positions.

Other objects of the invention are to provide a three way cock of the flange type in which the valve member housing comprises cooperating all plastic body end cap components releasably pinned together to house a spool type valve member formed to have a constant contact sealing action with the valve chamber, to provide a three way cock arrangement accommodating replacement of the spool only where the spool has become defective, and to provide a three way cock construction that in general is economical of manufacture, convenient to apply and use, and long lived in operation.

In accordance with the present invention, the cock comprises a one piece body defining a cylindrical portion, a foot portion extending parallel to the body cylinder portion for applying the cock to the side of the plate flange style, and a flange portion connecting the body cylinder portion and foot portion through which extend a pair of fluent passages that connect the bore of the body cylinder portion, and upper and lower ports formed in the body cylinder portion, with correspondingly located fluent passages of the plate. The body cylinder portion has reciprocably mounted in same a spool portion under the action of opposed cam surfaces formed in the body cylinder portion and an end cap received over the upper end of the body cylinder portion, through which the valve member extends for keying connection to an operating knob for turning the valve member to move it between the three operating positions of the cock.

The cock body and end cap are coupled together by an interfitting lug and latch pin arrangement. The knob is skirted and provided with laterally projecting position indicating lugs for appropriately positioning the cock spool valve member at the three main operating positions of the valve, as indicated by a datum reference lug formed in the end cap with which the knob skirt is aligned.

The cock body, end cap, knob, and valve member are molded components formed from a corrosion resisting plastic material with minimized machine requirements being involved to complete the product.

Other objects, uses, and advantages will be obvious or become apparent from a consideration of the following detailed description and the application drawings in which like parts are indicated by like reference numerals throughout the several views.

In the drawings:

FIG. 1 is a side elevational view of a preferred embodiment of the invention applied to a filter plate in its operative position;

FIGS. 2 and 3 are top and bottom plan views respectively of the cock shown in FIG. 1;

FIG. 5A is a view similar to that of FIG. 5, showing the valve member disposed in the "off" position;

Figure 4:
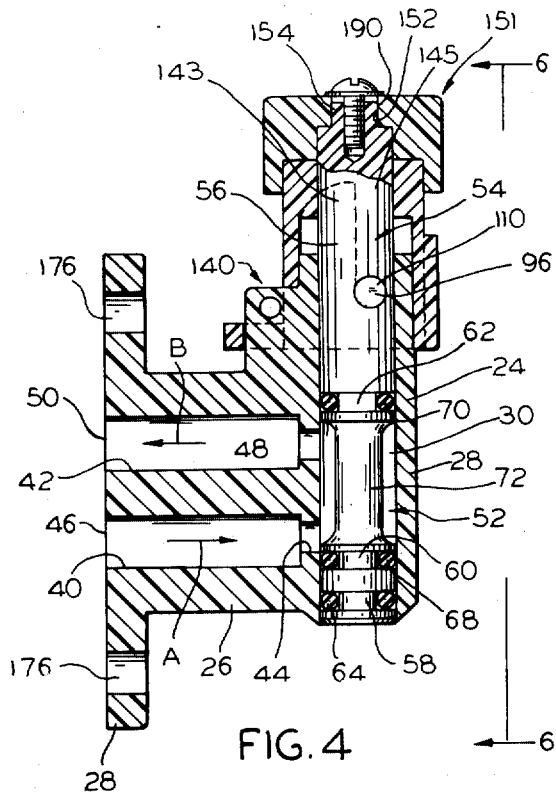
FIG. 4 is a vertical sectional view through the cock, with parts of the cock valve member being shown in elevation, and with the cock valve member positioned for closed discharge of the fluent.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

Reference numeral 10 of FIG. 1 generally indicates a preferred embodiment of the invention applied to a diagrammatically illustrated filter plate 12 of the type employed in filter presses. Plate 12 includes the usual fluent passages 14 and 16 that lead to the side surface portion 18 of the filter plate 12 which is surfaced for application of a flange mount type cock thereto.

Filter plate cocks serve the function of directing fluent from inside the filter plate 12, that is supplied to the cock through passage 14, to passage 16 communicating with internal filter press passage 20 for closed discharge of the fluent at the end of the filter press assembly. Three way cocks conventionally also provide for open discharge from the cock into a trough or the like below the plate 12.

The cock 10 generally comprises a one piece all plastic body 22 having a cylinder or barrel portion 24, a flange portion 26 extending laterally of and in coplanar relation with the cylinder or barrel portion 24, and a foot portion 28 that defines the usual mounting flange for a flange type cock.

Figure 5:
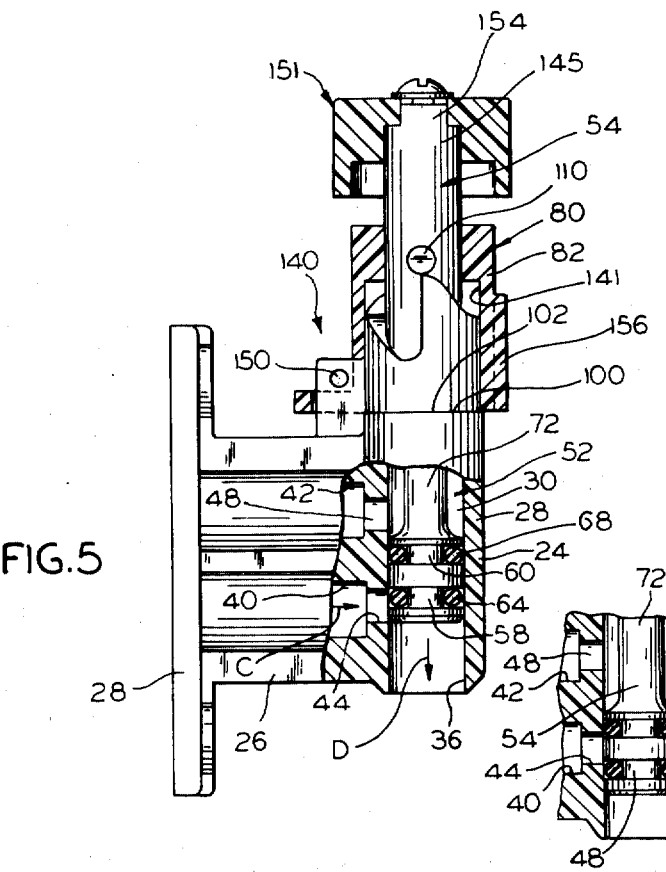
FIG. 5 is a view similar to that of FIG. 4, showing the valve member positioned for open discharge of the fluent from the plate, with the cock body being partially shown in elevation.

As indicated in FIGS. 4 and 5, the body cylinder portion defines a cylindrical wall 28 in turn defining bore 30 that extends longitudinally of the body cylinder or barrel portion 24. The cylinder or barrel portion 24 is open at its upper end 32 as well as its lower end 34, with the lower end 34 defining open discharge port 36.

The flange portion 26 of body 22 is shaped to define a pair of integral tubular segments 36 and 38 that are respectively shaped to define passageways 40 and 42 that in the form shown are in parallelism and extend through the flange portion 26. The passage 40 communicates between a port 44 formed in the wall 24 and the port 46 formed in the foot portion 28.

Reciprocably mounted in the valve chamber 52 is spool valve 54 which comprises elongate valve member 56 that is of generally cylindrical configuration and shaped to define recesses 58, 60 and 62 which are respectively equipped with the respective O-ring seals 64, 68 and 70 that are in fluid sealing relation, O-ring style, with the bore 30.

The valve member 56 between the grooves 60 and 62 is shaped to define a reduced fluent flow accommodating section 72 that is proportioned lengthwise of the member 56 to exceed somewhat the distance between the upper margin of the port 48 and the lower margin of the port 44 so that when the valve member 56 is positioned as shown in FIG. 4, the aforementioned closed discharge of the fluent from filter press plate 12 will occur, as indicated by the arrows A and B in FIG. 4. In this positioning, the seals 68 and 70 straddle ports 44 and 48 to maintain fluid tight sealing conditions on either side of the ports 44 and 48, thus limiting fluid flow to the indicated closed discharge condition.

In this connection, the valve member 56 is adapted to be moved from the lowermost position shown in FIG. 4 to the uppermost position shown in FIG. 5, wherein the cock is positioned for open discharge through the port 36, as indicated by arrows C and D. In the intermediate position of FIG. 5A the valve member 56 is disposed to position seals 64 and 68 in straddling relation to the port 44, which closes off fluent flow into and through the cock 10.

Figure 6:
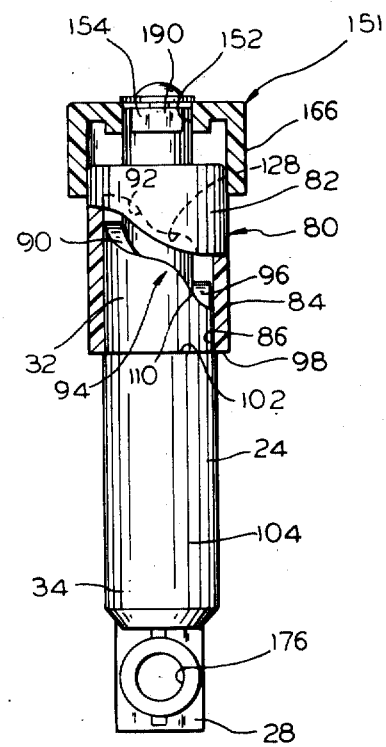
FIG. 6 is an end view of the cock, taken substantially along line 6—6 of FIG. 4, with parts being shown in section.

As indicated in FIGS. 4, 5, and 6, the valve member 56 projects upwardly through the open end 32 of the body cylinder portion 24 for operation by the operator.

Operably associated with the body cylinder or barrel portion 24 and the valve member 56 is end cap 80. End cap 80 comprises a cap member 82 of one piece construction including a main cylindrical portion 84 having its bore 86 proportioned for close fitting relation over the end 32 of the cock body cylinder portion 24 in the manner indicated in FIGS. 4, 5 and 6.

In accordance with the present invention, the upper end 32 of the body cylinder portion 24 and the end cap 80 are formed with opposed pairs of cam surfaces 90 and 92 that are of complemental configuration, and that, when the cap 80 is applied to the body portion 24 in accordance with the present invention, define a cam slot 94 (see FIG. 6) in which operates a pair of cam followers 96 on either side of the valve member 56.

The cap member 80 fits down over the end 32 of body portion 24 until the end surface 98 of the end cap 80 seats against the stop 100 that is formed by external shoulder 102 formed in the exterior surfacing 104 of the cock body cylinder portion 24.

This spaces the cam surfaces 90 and 92 from each other a distance substantially complementing the diameter of the cross pin 110 which is affixed to and extends crosswise of valve member 56 to define the oppositely disposed cam followers 96 on the side of the valve member 56.

The cam surfaces 90 and 92 in the form shown comprise a pair of the surfaces 90 formed by the body portion 24 opposing a pair of the surfaces 92 formed by end cap 80. Both pairs of surfaces 90 and 92 extend generally spirally of the body cylinder portion 24 and end cap 80, respectively, but as to each pair of such cam surfaces, one cam surface, for instance cam surface 90, is 180° out of phase with the other cam surface 90, with the result being that each cam surface 90 extends approximately 180° about the side surface of the body cylinder portion 24 in an equal and opposite manner defining oppositely disposed dwell portions 120, 122 and 124.

Figure 7:
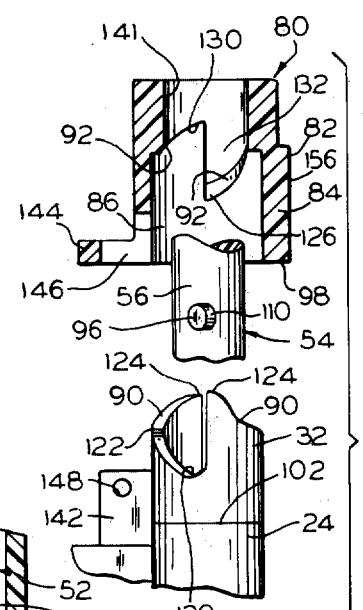
FIG. 7 is a fragmental exploded perspective view illustrating the relationship between the device cam surfaces and the valve member cam follower, with one part shown in section.

Similarly, the cam surfaces 92 of the end cap 80 are similarly arranged in an equal but opposite manner 180° out of phase about the circumference of the cap 80, and define dwell portions 126, 128 and 130. As is best brought out by the showing of FIG. 7, the cam surfaces 92 of the cap member 80 are defined by ledging 132 formed within the cap 80 and proportioned and located within the end cap 80 to be aligned with the respective cam surfaces 90 when the end cap 80 is applied to the cock body 24 in the manner indicated in the drawings.

When the end cap 80 is properly applied to the cock body cylinder portion 24, to define cam slot 94 the dwell portions 130 of the surfaces 92 will oppose the dwell portions 124 of the surfaces 90, longitudinally of bore 30. Dwell portions 128 of the surfaces 92 will oppose the dwell portions 122 of the surfaces 90, and the dwell portions 126 of the surfaces 92 will oppose the dwell portions 120 of the surfaces 90.

Further in accordance with the invention, the end cap 80 is secured to the cock body 22 by interfitting lug and lock pin arrangement 140, which comprises the valve body cylinder portion 24 being formed with lug 142 which is coplanar with the body flange portion 26 and projects laterally of the body cylinder portion 24 in the same direction as flange portion 26. Cap member 82 is formed with a laterally directed lug 144 that parallels its end surface 98 and is apertured as at 146 to receive the lug 142 in the manner indicated in FIGS. 1, 4 and 5.

Lug 142 is apertured as at 148 to receive cross pin 150 which locks the end cap 80 against removal from the cock body cylinder portion 24.

The lock pin 150 is proportioned for force or jam fitting within the aperture 148 as by providing the pin 150 with a somewhat tapered external surface proportioned to have one end of the pin 150 in jam fitting relation with the surfacing of lug 142 defining the aperture 148.

The upper end of the valve member 56 is formed to extend externally of the cap member 82, and the cap member 82 is formed with bore 141 for this purpose. The bore 141 and the external surfacing 143 of the valve member at its outwardly extending end 145 are of substantially complementing dimensions for the close fitting relationship indicated in FIGS. 4 and 5.

Operatively associated with the valve member 56 is knob 151 having a polygonally configured aperture 152 proportioned to closely receive the polygonally configured terminal end portion 154 of the valve member 56 for keying the knob 150 to the valve member 56 whereby the valve member 50 may be rotated relative to the cock body 22 to effect movement of the cam followers 96 along the opposed pairs of cam surfaces 90 and 92.

In the form shown, the cap member 82 includes datum indexing lug 156 that extends longitudinally of the cap member 82 and is positioned to be coplanar with the cock body lug 142 and the body flange portion 26. The securement of the cap member 82 to the cock body 22 in the manner indicated together with the proper orientation of the cap surfaces 90 and 92 with respect thereto and lug 142, permit establishment of the lug 156 as a datum reference for the datum markings or indexing structures 160, 162 and 164 formed in or on the knob 150, which in the form shown is provided with a skirt portion 166 for this purpose. As indicated in FIG. 2, the top 168 of the knob 150 may be suitably labeled to indicate the three operative positions of the cock, with the indexing structures 160, 162 and 164 being oriented relative to the cap member 82 and the valve member 56 such that when the indexing structure 160 is aligned with the datum lug 156, the closed discharge position of FIG. 4 is obtained; when the indexing structure 162 is aligned with the datum lug 156, the "off" or closed position of FIG. 5A is obtained, and when the indexing structure 164 is aligned with datum lug 156, the open discharge position of FIG. 5 is obtained.

In the form shown, the indexing structures 160, 162 and 164 are in the form of lugs formed in the knob skirt 166 but they may also be in the form of slots.

In the specific embodiment illustrated, the knob 150 is secured in place by securement screw 170 turned into the valve member 156 and bearing on washer 172 that overlies a portion of the knob top surface 168. In the form shown, the identification of the index structures 160, 162 and 164 are formed directly in the knob 150, but alternately, the washer may have a rim diameter substantially complementing that of the knob 150 and bear the indicia indicated in FIG. 2 (in which case the modified washer is keyed to the end of valve member 56 in the same manner as the knob 150 is keyed thereto).

The general arrangement of the cock 10 permits the cock body 22, cap 80 and knob 150 to be formed by molding procedures, and it is preferred that these parts be made of a suitable plastic material, such as polyethylene. Of parts, only the bore 30 of the body cylinder portion 24 need to be machined, and this only to the extent of insuring a good sealing action by the O-ring seals of the valve member 56.

The valve member 56 can be formed from the same materials and by a molding operation, and requires machining to define the grooves 58, 60 and 62, the reduced section 72, and the bore for cross pin 110 as well as the flat surfacing 190 that partially defines the polygonal configuration of valve member terminal 154. Member 50 may also be machined from rod stock.

The pins 110 and 151 may also be formed from a suitable plastic material, such as polypropylene, as well as screw 170. In the form shown, the washer 172 is conveniently an "off the shelf" metal washer, but obviously likewise this component could also be formed from a suitable plastic material.

In use, the cock 10 is applied in the manner indicated in FIG. 1 to a filter press plate 12 at its surface 18, suitable bolts 174 being applied to foot openings 176 and to the plate 12 to secure cock 10 against the plate surfacing 18. A suitable gasket 192 is interposed between the cock foot portion 28 and the filter press plate surface 18. The cock 10 permits samples of the fluent material being filtered to be taken from the plate 12, and permits the fluent material to be dumped from the plate 12, when the cock is in the position of FIG. 5. Putting the cock in the position of FIG. 4 directs the fluent material from the plate into the filter press passage 20 providing for closed discharge of the fluent from the filter press unit of which the plate 12 forms a part. The position of FIG. 5A precludes fluid flow through cock 10.

The reliable O-ring seals of the valve member 56 provide a reliable static and dynamic fluent seal between the valve member 56 and the body cylinder portion bore 30. Seals 30 are readily replaced when worn without having to replace the spool valve member as a whole. Should full replacement of the spool valve member as a whole be desirable, this can be accomplished by merely substituting another spool valve member for the defective one, without replacing the valve body 22 and other associated parts.

The interfitting lug and pin connection 140 provides a one point latching securement of the cap 80 to the body cylinder portion 24 which is not only effective in holding these parts together, but also orients them to insure the indexing of the valve member that is desired. Repairs to the internal parts of the cock can be easily effected by removing pin 150 and separating the cap 80 from the cock body 22.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A three way cock for securement to the side of a filter press plate, in vertically disposed operating position for controlling fluent discharge from the plate, said cock comprising:

a cock body defining a cylinder portion having a rectilinear bore that is vertically disposed in the cock operating position, said body defining a discharge port at the lower end of said bore and being open at the upper end of said bore, said body including a side flange portion coplanar with said bore and extending laterally of said bore, said body further including a planar foot portion paralleling said bore, with said body flange portion extending between said body cylinder and foot portions, said body defining a pair of spaced apart parallel fluent passages extending normally of said bore and communicating with said bore intermediate said bore ends through said body flange, foot and cylinder portions, to correspondingly located passages in the plate side, a spool valve member reciprocably received in said bore and proportioned lengthwise of said bore such that when the lower end of said spool is disposed at said lower end of said bore, the upper end of said spool projects from and above said upper end of said bore, an end cap received over the upper end of the body cylinder portion and being apertured to freely receive said upper end of said spool, said body and said end cap including interfitting lug means for keying said end cap to said body, said body adjacent said upper end of said bore and said end cap being formed to define complementing opposed cam surfaces in generally spiralled relation about the axis of said bore for defining the reciprocating movement limits of said spool valve within said bore, said spool valve having a cam follower riding on said cam surfaces, and means for turning said spool valve member about said bore axis for effecting travel of said spool valve cam follower along said cam surfaces to reciprocate said spool valve, said fluent passages each defining a port in the body cylinder portion opening into said bore, with said ports having a predetermined spacing longitudinally of said bore, said valve member defining a fluid flow accommodating portion of reduced circumferential dimension having a length longitudinally of said bore that exceeds the corresponding distance between said ports, said valve member including first and second fluid seal means respectively disposed adjacent the upper and lower ends of said valve member portion in sealing relation to said boy, and a third seal means adjacent the lower end of said valve member in sealing relation to said body and spaced below said second seal means a distance exceeding the width of the lower end of said ports for normally blocking fluent discharge from said body discharge port, said foot portion being formed for securement against the plate side with said body passages aligned with the plate passages, said cam surfaces being proportioned to, when said valve member is turned about said axis, shift said valve member seal means between a lower valve member position in which said first and second seal means receive said ports therebetween to an upper position in which said third means is disposed above the lower of said ports for effecting fluent discharge from said cock through said body discharge port, said second and third seal means in a third operative position of said valve member intermediate said lower and upper positions being disposed on either side of said lower port for precluding fluid flow into said cock from the plate.

2. The cock set forth in claim 1 wherein: said interfitting lug means comprises:
   a first lug on said body,
   a second lug on said end cap,
   with one of said lugs being apertured to receive the other of said lugs when said end cap is received on said body cylinder portion upper end to dispose said cam surfaces in camming relation to said cam follower,
   and including pin means for latchinng said lugs together.

3. The cock set forth in claim 2 wherein:
   said end cap is latched to said body exclusively by said pin means.

4. The cock set forth in claim 1 wherein:
   said cam surfaces are formed to define cam follower seats seating said cam follower at each of said positions of said seal means.

5. The cock set forth in claim 1 wherein said means for turning said spool valve member comprises:
   a knob keyed to said valve member at said upper end of same.

6. The cock set forth in claim 5 wherein:
   said knob includes a skirt in concentric relation to said end cap,
   said end cap and said lug having indexing means for indexing said valve member at said positions of said seal means.

7. The cock set forth in claim 1 wherein:
   said end cap includes a skirt in close fitting relation to said body cylinder portion and overlying the upper end of same,
   said cam surface of said end cap being internally of same and masked by said skirt.

8. The cock set forth in claim 7 wherein:
   said end cap and said body are each of one-piece construction formed from a non metallic material.

9. The cock set forth in claim 2 wherein:
   said end cap and said body are each of one-piece construction and are formed from a non metallic material,
   said pin means comprising a pin formed from a non metallic material and applied in force fitting relation to an aperture formed in the other of said lugs.

10. The cock set forth in claim 9 wherein:
   said material is polypropylene.

* * * * *